United States Patent
Hartmann et al.

(10) Patent No.: US 7,886,034 B1
(45) Date of Patent: Feb. 8, 2011

(54) ADAPTIVE LIVENESS MANAGEMENT FOR ROBUST AND EFFICIENT PEER-TO-PEER STORAGE

(75) Inventors: Alfred Hartmann, Round Rock, TX (US); Brian Witten, Reston, VA (US); Slava Kritov, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 1136 days.

(21) Appl. No.: 11/535,939

(22) Filed: Sep. 27, 2006

(51) Int. Cl.
*G06F 15/173* (2006.01)

(52) U.S. Cl. ...................................... 709/223; 711/100

(58) Field of Classification Search ................. 709/203, 709/213, 232; 707/200; 375/240.24; 370/352; 711/118
See application file for complete search history.

(56) References Cited

U.S. PATENT DOCUMENTS

| | | | | |
|---|---|---|---|---|
| 7,069,295 B2 * | 6/2006 | Sutherland et al. | ........... | 709/203 |
| 7,437,386 B2 * | 10/2008 | Callahan et al. | ............. | 707/200 |
| 7,461,206 B2 * | 12/2008 | Bhanoo et al. | ............... | 711/118 |
| 7,546,342 B2 * | 6/2009 | Li et al. | ....................... | 709/203 |
| 7,627,644 B2 * | 12/2009 | Slack-Smith | ................. | 709/213 |
| 2006/0069800 A1 * | 3/2006 | Li | ............................. | 709/232 |
| 2007/0133691 A1 * | 6/2007 | Kozat | .................... | 375/240.24 |
| 2008/0130630 A1 * | 6/2008 | Shim et al. | .................. | 370/352 |

* cited by examiner

*Primary Examiner*—Dustin Nguyen
(74) *Attorney, Agent, or Firm*—Brill Law Office; Jeffrey Brill

(57) ABSTRACT

A peer-to-peer storage manager measures availability (liveness) of the various nodes in a peer-to-peer storage pool, and adjusts the storage of data within the pool to meet performance expectations based on this liveness information. Based on node liveness statistics, the peer-to-peer storage manager fine tunes storage up or down to efficiently allocate storage while maintaining service level objectives for retrieval time probabilities. Responsive to node liveness information, the peer-to-peer storage manager can dynamically adjust redundancy and/or determine which nodes on which to store data. The peer-to-peer storage manager can execute these storage modifications using rateless erasure codes that allow highly robust storage with only weakly synchronized directory update protocols.

15 Claims, 2 Drawing Sheets

ADAPTIVE LIVENESS MANAGEMENT FOR ROBUST AND EFFICIENT PEER-TO-PEER STORAGE

TECHNICAL FIELD

This invention pertains generally to peer-to-peer storage, and more specifically to adapting to node liveness to optimize retrieval probabilities.

BACKGROUND

Peer-to-peer storage is a distributed storage technology with the potential to achieve Internet scale with only modest additional infrastructure investment. Peer-to-peer storage exploits encryption and erasure encoding to securely distribute storage items over a pool of peer storage nodes, accessed via traditional peer-to-peer directory mechanisms such as distributed hash tables (DHTs).

Distributed peer-to-peer storage has the potential to provide essentially limitless, highly reliable, always available storage to the masses of Internet users. Since each participant in the peer storage pool is typically required to contribute storage in proportion to their demand on the pool, it is a self-scaling technique, in contrast to centralized peer-to-peer and storage approaches that demand enormous capital investment and have limited scalability. Encryption is used to secure the data against peer snooping, and erasure encoding is used to store the information with sufficient redundancy for timely retrieval and to prevent ultimate information loss.

Erasure encoding transforms a storage item of n blocks into greater than n blocks such that any sufficiently large subset of blocks is sufficient to reconstitute the storage item. The fraction of blocks required to reconstitute is termed the rate, r. Optimal erasure codes produce n/r blocks with any n blocks sufficient to reconstitute, but these codes are computationally demanding. Near optimal erasure codes require $(1+\epsilon)n$ blocks but reduce computational effort. Rateless erasure codes produce arbitrary numbers of blocks so that encoding redundancy can be adapted to the loss rate of the channel. More specifically, rateless erasure codes can transform an item into a virtually limitless number of blocks, such that some fraction of the blocks is sufficient to recreate the item. Examples of near optimal rateless erasure codes include online codes, LT codes, and Raptor codes.

Erasure codes are typically robust in the face of incomplete retrievals resulting from discontinuous online availability of peer storage nodes. As long as a sufficiently large subset of stored blocks is retrieved, the encrypted storage item can be fully reconstituted and then be decrypted.

In distributed peer-to-peer storage, retrieval probabilities are managed to ensure that requests are honored in a timely manner and that permanent information loss is statistically highly unlikely. Timely retrieval has the potential to be frustrated by the discontinuous online availability of peer nodes, thus requiring a very high degree of redundancy in the erasure encoding (i.e., use of an inefficient low rate code) in order to avoid "information blackouts."

In order for a peer-to-peer storage system to be universally self-scaling, it must accommodate all significant classes of peer nodes. Some nodes might be always or nearly always online, whereas others might be intermittently online to varying degrees. Both liveness (i.e. probability of a node being online at some time t) and bandwidth, when online will vary over a substantial range when considering the entire Internet client base as a peer storage pool.

What is needed are methods, computer readable media and computer systems for ensuring that requests are honored in a timely manner in a peer-to-peer storage system which is made up of nodes with a wide range of variations in liveness.

SUMMARY OF INVENTION

The general availability (liveness) of the various nodes in a peer-to-peer storage pool is measured, and the storage of data within the pool is adjusted to meet performance expectations based on this liveness information. More specifically, based on node liveness statistics, a peer-to-peer storage manager fine tunes storage up or down to efficiently allocate storage while maintaining service level objectives for retrieval time probabilities and/or retrieval time latencies. Responsive to node liveness information, the peer-to-peer storage manager can dynamically adjust redundancy and/or determine which nodes on which to store data. The peer-to-peer storage manager can execute these storage modifications using rateless erasure codes that allow highly robust storage with only weakly synchronized directory update protocols.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
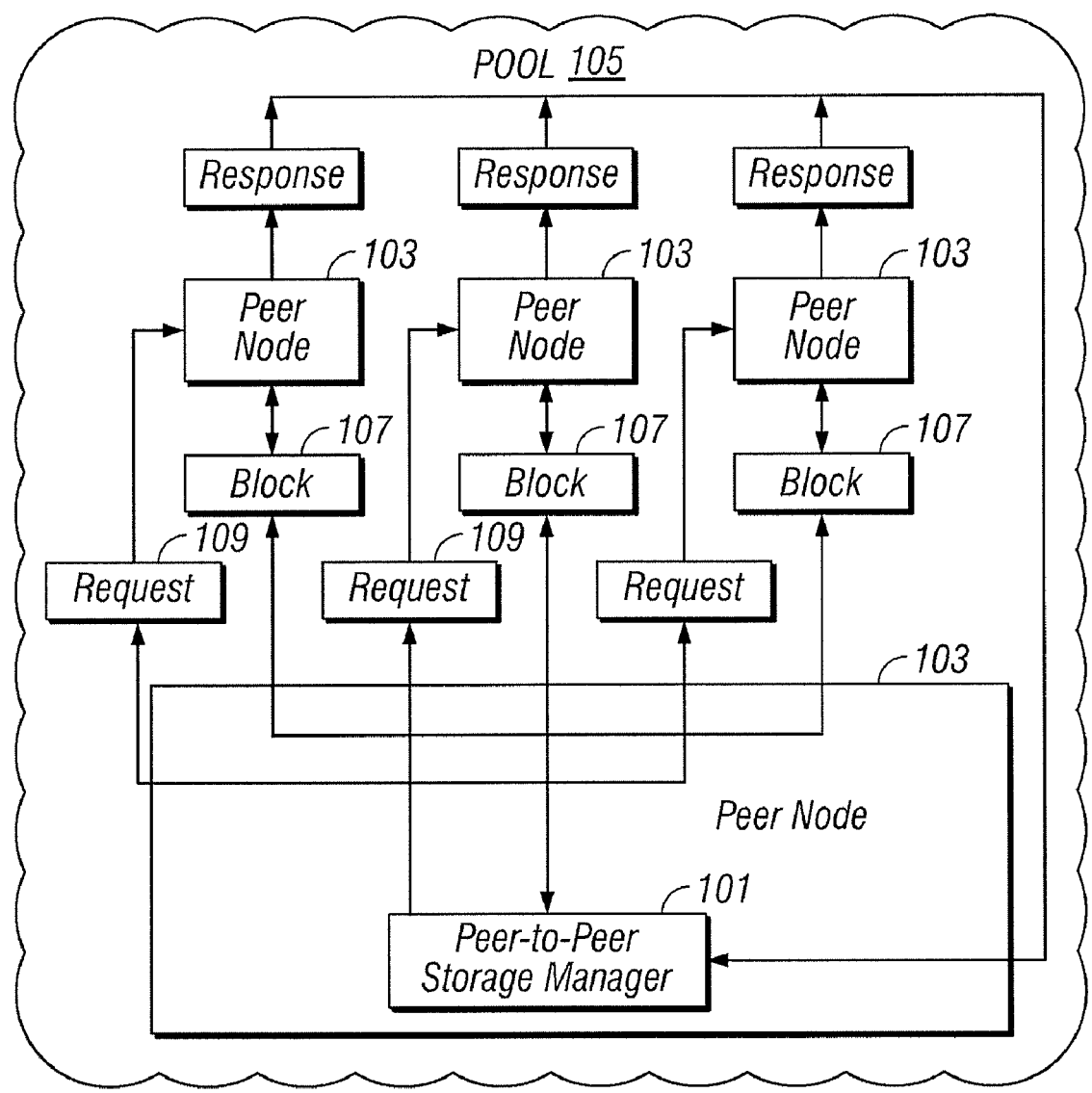
FIG. 1 is a block diagram illustrating a high level overview of the operations of a peer-to-peer storage manager, according to some embodiments of the present invention.

FIG. 1 illustrates a peer-to-peer storage manager 101, according to some embodiments of the present invention. It is to be understood that although the peer-to-peer storage manager 101 is illustrated as a single entity, as the term is used herein a peer-to-peer storage manager 101 refers to a collection of functionalities which can be implemented as software, hardware, firmware or any combination of these. Where a peer-to-peer storage manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the peer-to-peer storage manager 101 tracks the liveness of nodes 103 in a peer-to-peer storage pool 105, and adaptively manages the storage of blocks 107 in response. In this way, the peer-to-peer storage manager 101 enables timely information retrieval with minimal encoding redundancy. The peer-to-peer storage manager 101 determines the degree of redundancy/and or on which nodes 103 to store which blocks 107 by adaptively balancing expected retrieval time against peer node 103 liveness (i.e. the probability of a peer node 103 being available online).

In one embodiment, the peer-to-peer storage manager 101 periodically tracks node 103 liveness by sending retrieval requests 109 (or liveness pings or the like) to the various client nodes 107 participating in the pool 105. The peer-to-peer storage manager 101 can then measure the received responses 111. In another embodiment, each time a node 103 joins the pool 105 and periodically thereafter until it disconnects, the node 103 reports its continued liveness to the peer-to-peer storage manager 101. This embodiment eliminates the polling of disconnected nodes 103 by the peer-to-peer storage manager 101. In any case, the peer-to-peer storage manager 101 can statistically assess the retrieval probabilities of nodes 103 based upon the gleaned liveness data 111. This assessment can be as simple as a survey of which nodes 103 are currently live, or can involve more complicated statistical analysis, taking into account data such as historical availability of various nodes 103 or types of nodes 103 over time.

The peer-to-peer storage manager 101 adjusts node 103 assignment for block 107 storage and/or storage redundancy to maintain retrieval probability objectives. For example, if retrieval probabilities are estimated to fall below objectives, then the peer-to-peer storage manager 101 can increase erasure encoding redundancy and/or can transfer data blocks 107 to nodes 103 with higher liveness.

Figure 2:
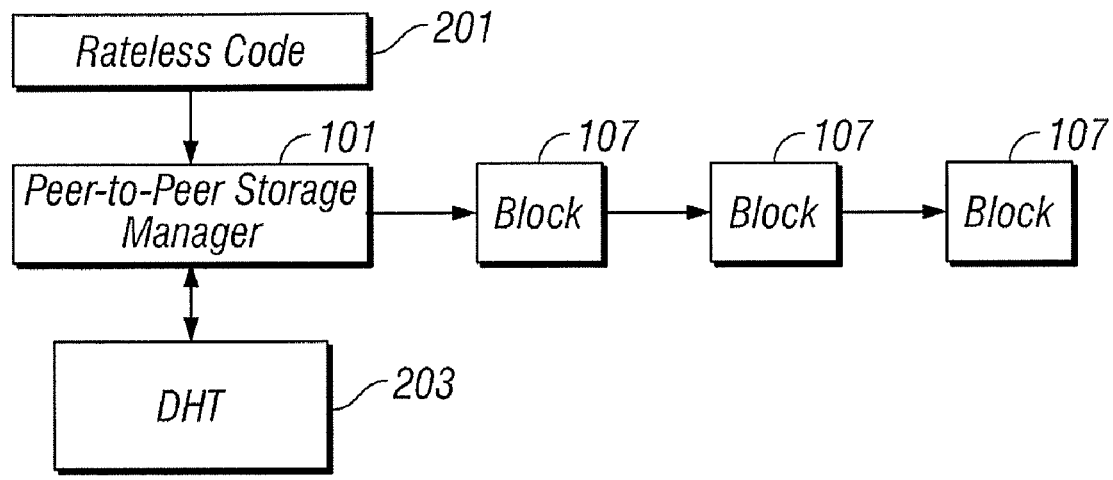
FIG. 2 is a block diagram illustrating a peer-to-peer storage manager adjusting redundancy responsive to node liveness, according to some embodiments of the present invention.

Turning now to FIG. 2, in some embodiments the peer-to-peer storage manager 101 uses rateless codes 201 to increase redundancy. Rateless codes 201 offer some advantages, in that additional redundant blocks 107 do not have to be immediately reflected in the DHT 203. More specifically, because rateless codes 201 produce an arbitrary number of blocks 107, the block 107 set (and hence the DHT 203 directory information) does not need to be rebuilt when redundancy is increased. Thus, the DHT 203 can be asynchronously updated, thereby allowing changes to ripple through the DHT 203 directory mechanisms. If multiple updates to the DHT 203 directory information are executed at the same time, the result could be that some extra blocks 107 are not initially accounted for in the DHT 203. However, this is acceptable in a rateless code 201 scenario with an arbitrary number of blocks 107. The DHT 203 can be synchronized to account for the additional blocks 107 after the fact.

This progressive updating of DHT 203 directories is a highly desirable property for an Internet-scale DHT 203 directory scheme. When liveness improves and redundancy is adaptively pruned, the same progressive updating can be utilized. In this case, if multiple updates to the DHT 203 occur simultaneously, stale block 107 entries could result. However, a stale block 107 DHT 203 entry simply counts as a block 107 retrieval failure, which the erasure encoding is robust towards.

Figure 3:
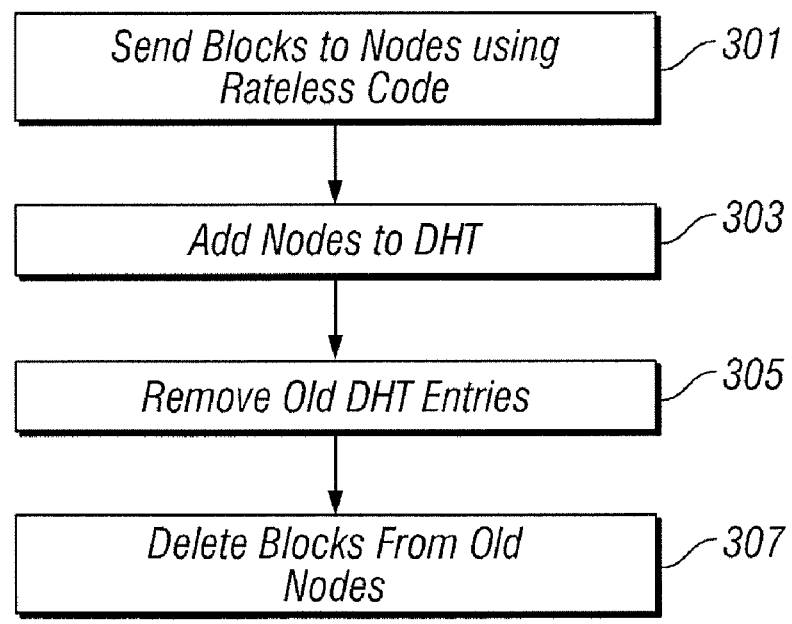
FIG. 3 is a flowchart illustrating steps for moving blocks between nodes responsive to node liveness, according to some embodiments of the present invention.

As illustrated in FIG. 3, the peer-to-peer storage manager 101 can move blocks to different nodes 103 progressively as well, without having to tightly synchronize the corresponding DHT 203 updates. To do so, the peer-to-peer storage manager 101 uses a rateless code 201 to send 301 new blocks 107 to the new nodes 103, adding 303 the new nodes 103 as additional block 107 holders in the DHT 203. Then, the DHT 203 directory entries for the old nodes 103 are removed 305, and finally the blocks 107 could be deleted 307 from the old nodes 103. This updating scheme is robust, allowing changes to ripple progressively across the pool 105 without stale DHT 203 entries compromising retrieval probabilities.

In other embodiments, the peer-to-peer storage manager 101 uses rated codes (not illustrated) to adjust redundancy and/or move blocks 107 to meet performance expectations, but in these embodiments the peer-to-peer storage manager 101 rebuilds block 107 sets and updates the DHT 203 accordingly.

It is to be understood that any response or combination of responses to adjust performance up or down based on measured node 103 liveness is within the scope of the present invention. In addition to taking steps to account for retrieval time probabilities, steps can also be taken to account for retrieval latency. For example, suppose a retrieval request 109 is issued ahead of need (e.g., a request 109 is issued in the morning to download a movie to be viewed that night). Such requests 109 allow for delayed retrieval. Where known, such latency data can be factored into the peer node 103 assignment strategy. Furthermore, in addition to adjusting redundancy and/or moving blocks 107, supplementary steps can also be taken, such as ensuring the blocks 107 are distributed according to geographical diversity, ensuring blocks 107 are distributed across nodes 103 that have the least amount of overlap in their projected downtimes, etc.

It is to be further understood that adaptive liveness management as described herein can be implemented in a distributed manner across the pool 105 of client nodes 103, or it can be performed by separate management nodes 103 operated as part of the pool 105 infrastructure. Furthermore, the above described functionality can be implemented in a fully distributed "peer-to-peer" model, but can also be implemented with portions of this "peer-to-peer" infrastructure residing in nodes 103 that are centrally managed, centrally maintained, centrally located, or any combination of the above, with such "central" nodes 103 having higher liveness in such hybrid architectures. In other words, the peer-to-peer storage manager 101 can be as distributed or centralized as desired.

Moreover, because some stored content may serve as a directory or directories for retrieving other content, where retrieval of the latter content depends upon retrieval of the former content, the former content can be moved to nodes 103 with greater liveness so that the probabilities of meeting goals for retrieval timeliness of the latter content are maintained.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for robustly managing peer-to-peer storage, the method comprising the steps of:
    storing an item in a peer-to-peer storage pool as data blocks, at least some of the data blocks being redundant, the redundant data blocks being stored on different nodes of the peer-to-peer storage pool;
    tracking liveness of nodes in the peer-to-peer storage pool to determine a retrieval probability of the item as a whole; and
    modifying storage of data blocks within the peer-to-peer storage pool responsive to tracked liveness information comprising changing a number of redundant data blocks to adjust the retrieval probability in accordance with a predetermined threshold.

2. The method of claim 1 wherein tracking liveness of nodes in the peer-to-peer storage pool further comprises:
    transmitting a request to at least one node in the peer-to-peer storage pool; and
    receiving a response from the at least one node.

3. The method of claim 1 wherein adjusting redundancy of storage of blocks of data in the peer-to-peer storage pool further comprises:
    using a rateless code to adjust redundancy of storage of blocks of data in the peer-to-peer storage pool; and
    permitting asynchronous updating of distributed hash table directory information in the peer-to-peer storage pool, to reflect the adjusted redundancy.

4. The method of claim 3 further comprising:
    subsequently synchronizing the distributed hash table directory information.

5. The method of claim 1 wherein modifying storage of data blocks within the peer-to-peer storage pool responsive to tracked liveness information further comprises:
    moving stored blocks of data to nodes with different liveness profiles in the peer-to-peer storage pool, responsive to tracked liveness information.

6. The method of claim 5 wherein moving stored blocks of data to nodes with different liveness profiles in the peer-to-peer storage pool further comprises:
    using a rateless code to store blocks of data on new nodes with different liveness profiles from the old nodes on which the blocks where originally stored;
    adding the new nodes as additional block holders in a distributed hash table;
    removing directory entries in the distributed hash table concerning storage of the blocks on the old nodes; and
    deleting the blocks from the old nodes.

7. At least one non-transitory computer readable medium containing a computer program product for robustly managing peer-to-peer storage, the computer program product comprising:
    program code for storing an item in a peer-to-peer storage pool as data blocks, at least some of the data blocks being redundant, the redundant data blocks being stored on different nodes of the peer-to-peer storage pool;
    program code for tracking liveness of nodes in the peer-to-peer storage pool to determine a retrieval probability of the item as a whole; and
    program code for modifying storage of data blocks within the peer-to-peer storage pool responsive to tracked liveness information comprising changing a number of redundant data blocks to adjust the retrieval probability in accordance with a predetermined threshold.

8. The computer program product of claim 7 wherein the program code for tracking liveness of nodes in the peer-to-peer storage pool further comprises:
    program code for transmitting a request to at least one node in the peer-to-peer storage pool; and
    program code for receiving a response from the at least one node.

9. The computer program product of claim 7 wherein the program code for adjusting redundancy of storage of blocks of data in the peer-to-peer storage pool further comprises:
    program code for using a rateless code to adjust redundancy of storage of blocks of data in the peer-to-peer storage pool; and
    program code for permitting asynchronous updating of distributed hash table directory information in the peer-to-peer storage pool, to reflect the adjusted redundancy.

10. The computer program product of claim 9 further comprising:
    program code for subsequently synchronizing the distributed hash table directory information.

11. The computer program product of claim 7 wherein the program code for modifying storage of data blocks within the peer-to-peer storage pool responsive to tracked liveness information further comprises:
    program code for moving stored blocks of data to nodes with different liveness profiles in the peer-to-peer storage pool, responsive to tracked liveness information.

12. The computer program product of claim 11 wherein the program code for moving stored blocks of data to nodes with different liveness profiles in the peer-to-peer storage pool further comprises:
    program code for using a rateless code to store blocks of data on new nodes with different liveness profiles from the old nodes on which the blocks where originally stored;
    program code for adding the new nodes as additional block holders in a distributed hash table;
    program code for removing directory entries in the distributed hash table concerning storage of the blocks on the old nodes; and
    program code for deleting the blocks from the old nodes.

13. A computer system comprising non-transitory storage memory for robustly managing peer-to-peer storage, the computer system comprising:
    a peer-to-peer storage manager configured to store an item in a peer-to-peer storage pool as data blocks, at least some of the data blocks being redundant, the redundant data blocks being stored on different nodes of the peer-to-peer storage pool, the peer-to-peer manager configured to track liveness of nodes in a peer-to-peer storage pool to determine a retrieval probability of the item as a whole, and;
    the peer-to-peer storage manager configured to modify storage of data blocks within the peer-to-peer storage pool responsive to tracked liveness information comprising changing a number of redundant data blocks to adjust the retrieval probability in accordance with a predetermined threshold.

14. The computer system of claim 13 wherein the peer-to-peer storage manager configured to adjust redundancy of storage of blocks of data in the peer-to-peer storage pool is further configured to:

use a rateless code to adjust redundancy of storage of blocks of data in the peer-to-peer storage pool; and permit asynchronous updating of distributed hash table directory information in the peer-to-peer storage pool, to reflect the adjusted redundancy.

15. The computer system of claim 13 wherein the peer-to-peer storage manager configured to modify storage of data blocks within the peer-to-peer storage pool responsive to tracked liveness information is further configured to:

move stored blocks of data to nodes with different liveness profiles in the peer-to-peer storage pool, responsive to tracked liveness information.

* * * * *